US011140689B2

(12) United States Patent
Duengen et al.

(10) Patent No.: US 11,140,689 B2
(45) Date of Patent: Oct. 5, 2021

(54) METHOD FOR OPERATING A NETWORK INFRASTRUCTURE-SIDE NETWORK UNIT, NETWORK INFRASTRUCTURE-SIDE NETWORK UNIT, METHOD FOR OPERATING A ROADSIDE NETWORK UNIT, ROADSIDE NETWORK UNIT

(71) Applicant: Robert Bosch GmbH, Stuttgart (DE)

(72) Inventors: Monique Duengen, Hannover (DE); Christine Haas, Ludwigsburg (DE); Christoph Thein, Hildesheim (DE); Frank Hofmann, Hildesheim (DE); Kurt Eckert, Ditzingen (DE); Peter Svejkovsky, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 100 days.

(21) Appl. No.: 16/631,953

(22) PCT Filed: Jun. 11, 2018

(86) PCT No.: PCT/EP2018/065290
§ 371 (c)(1),
(2) Date: Jan. 17, 2020

(87) PCT Pub. No.: WO2019/015870
PCT Pub. Date: Jan. 24, 2019

(65) Prior Publication Data
US 2020/0178268 A1    Jun. 4, 2020

(30) Foreign Application Priority Data

Jul. 18, 2017 (DE) .......................... 102017212244.7
Oct. 13, 2017 (DE) .......................... 102017218320.9

(51) Int. Cl.
*H04W 72/12* (2009.01)
*H04L 5/00* (2006.01)
(Continued)

(52) U.S. Cl.
CPC .......... *H04W 72/121* (2013.01); *H04L 5/001* (2013.01); *H04W 56/0005* (2013.01);
(Continued)

(58) Field of Classification Search
CPC combination set(s) only.
See application file for complete search history.

(56) References Cited

U.S. PATENT DOCUMENTS

2016/0338094 A1    11/2016   Faurie et al.
2017/0099624 A1     4/2017   Baghel et al.
(Continued)

FOREIGN PATENT DOCUMENTS

EP    3133896 A1    2/2017

OTHER PUBLICATIONS

International Search Report for PCT/EP2018/065290, dated Oct. 9, 2018.
(Continued)

*Primary Examiner* — Kyaw Z Soe
(74) *Attorney, Agent, or Firm* — Norton Rose Fulbright US LLP; Gerard Messina (57) ABSTRACT

A method for operating a network infrastructure-side network unit of a cell-based wireless communication network is provided. The method includes: receiving a scheduling request message for a sidelink channel in an unlicensed frequency range on an uplink channel by a roadside network unit, the scheduling request message indicating a size of the data available for transmission on the sidelink channel at the roadside network unit; ascertaining a scheduling grant message as a function of the size, the scheduling grant message including an assignment of a number of sidelink resources of the sidelink channel to the roadside network unit, and the assigned number of sidelink resources being sufficient to transmit the available data and additional data of other
(Continued)

roadside network units; and transmitting the scheduling grant message to the roadside network unit on a downlink channel.

15 Claims, 6 Drawing Sheets

(51) Int. Cl.
    *H04W 56/00* (2009.01)
    *H04W 72/04* (2009.01)
    *H04W 72/14* (2009.01)
    *H04W 74/00* (2009.01)

(52) U.S. Cl.
    CPC ......... *H04W 72/042* (2013.01); *H04W 72/14* (2013.01); *H04W 74/004* (2013.01)

(56) References Cited

U.S. PATENT DOCUMENTS

| | | |
|---|---|---|
| 2020/0128569 A1* | 4/2020 | Hassan Hussein ... H04L 5/0048 |
| 2020/0178269 A1* | 6/2020 | Haas ................. H04W 72/1284 |
| 2020/0196312 A1* | 6/2020 | Faurie ............... H04W 72/1205 |

OTHER PUBLICATIONS

3GPP TS 36.300 V14.2.0 (Mar. 2017), 330 pages.
ETSI EN 302 663 V1.2.0 (Nov. 2012), 24 pages.
ETSI TS 102 687 V1.1.1 (Jul. 2011), 45 pages.
IEEE 802.11P-2010 Standard "IEEE Standard for Information Technology—Local and Metropolitan Area Networks—Specific Requirements—Part 11: Wireless LAN Medium Access Control (MAC) and Physical Layer (PHY) Specifications, Amendment 6: Wireless Access in Vehicular Environments", 51 pages.

* cited by examiner

METHOD FOR OPERATING A NETWORK INFRASTRUCTURE-SIDE NETWORK UNIT, NETWORK INFRASTRUCTURE-SIDE NETWORK UNIT, METHOD FOR OPERATING A ROADSIDE NETWORK UNIT, ROADSIDE NETWORK UNIT

FIELD

The present invention relates to a method for operating a network infrastructure-side network unit, a network infrastructure-side network unit, a method for operating a roadside network unit and a roadside network unit.

BACKGROUND INFORMATION

Vehicles today are already able to exchange information with other vehicles in their vicinity (V2V: vehicle to vehicle). Vehicles may also communicate wirelessly with roadside infrastructure (V2I: vehicle to infrastructure). Likewise, the vehicle may communicate wirelessly with a back end server on the Internet (V2N: vehicle to network) or with a pedestrian terminal (V2P: vehicle to person). This communication is also referred to overall as vehicle to everything (V2X).

The development of new functions and services in the automotive industry, such as automated driving, benefits from V2X. Traffic safety, driving comfort and energy efficiency may be improved. This results in new products and business models for automotive manufacturers, automotive suppliers and other service providers.

The first generation of V2X applications, to be used in the years ahead, is based primarily on use on the road. Their purpose is to provide the driver with information about the road surroundings. Vehicles periodically provide status information (e.g., position, speed, acceleration, etc.) and/or event information (rescue operations, a broken-down vehicle, traffic jams). This information is generally transmitted locally in the form of text messages. This event-based piece of information may be sent to a central network unit (base station, backend) by neighboring vehicles.

There are presently two competing technologies for V2X direct device-to-device (D2D) communication. The first technology is based on the radio-based IEEE 802.11p standard, which forms the basis for the comprehensive DSRC standard (Dedicated Short Range Communication) in the United States and the ETSI ITS G5 standard (ETSI: European Telecommunications Standards Institute; ITS: Intelligent Transport Systems) in Europe. The second technology is based on 3GPP (3rd Generation Partnership Project) LTE (Long Term Evolution) and is also known by the abbreviation LTE-V2X. An enhancement of the LTE-V2X technology is expected with 5G (5th generation mobile networks).

The IEEE 802.11p standard uses the PHY layer of the IEEE 802.11a standard, based on orthogonal frequency division multiplexing (OFDM) with a number of modifications. The MAC layer is based on enhanced distributed channel access (EDCA), which is competition-based. Carrier sense multiple access (CSMA) with collision avoidance (CSMA/CA) is also used. CSMA/CA follows the listen-before-talk principle for minimizing collisions on the channel. When a network unit (a vehicle in this context) has data to transmit, it carries out a channel measurement to check whether the channel is occupied. If the channel is detected to be empty, the network unit delays the planned transmission for a randomly ascertained time and then begins the transmission. If the channel is occupied during the channel measurement, the network unit will carry out a backoff procedure, i.e., it awaits the next channel access for a randomly ascertained period of time. The greater the number of network units attempting to transmit within a geographic area, the greater the probability that a network unit delays its transmission, which results in overall longer delays in the network. The IEEE 802.11p standard offers advantages over other WLAN standards based on IEEE 802.11 with regard to latency and signaling complexity and is adapted to the V2V application scenario.

The LTE extension for V2X in 3GPP Release 14 and higher proposes to use a licensed and/or an unlicensed spectrum for the communication. The V2V communication is based on a direct device-to-device interface (also referred to as a sidelink interface on the physical layer). In contrast to 802.11p, the transmission takes place with cell support, i.e., it is carried out by the network in a planned manner. Transmission rights are granted by a scheduler unit situated in the base station, thus avoiding collisions and minimizing interferences. The control by the base station may be carried out only in areas in which the base station signal is available (in coverage). In a case in which no base station signal is available (out of coverage), the communication takes place via the sidelink, using predefined parameters.

During the course of developing communication standards—for example, based on different applications or development activities from different technological fields—various standards may be proposed for the same frequency range. As a result, different wireless communication systems would transmit in the same frequency range, resulting in performance impairments for both technologies.

Consequently, an objective technical task could be formulated in such a way that a coexistence mechanism for the two different wireless communication technologies is to be created to equitably distribute existing resources on a shared frequency range.

SUMMARY

An object of the present invention may be achieved by an example method for operating a network infrastructure-side network unit according to the present invention, by an example network infrastructure-side network unit according to the present invention, an method for operating a roadside network unit according to the present invention, and an example roadside network unit according to the present invention.

According to a first and second aspect of the present invention, the example network infrastructure-side network unit is operated as follows: receiving a scheduling request message for a sidelink channel in an unlicensed frequency range on an uplink channel by a roadside network unit, the scheduling request message indicating a size of data available for transmission on the sidelink channel for the roadside network unit; ascertaining a scheduling grant message as a function of the size, the scheduling grant message including an assignment of a number of sidelink resources of the sidelink channel to the roadside network unit, and the assigned number of sidelink resources being sufficient to transmit the available data and additional data; and transmitting the scheduling grant message to the roadside network unit on a downlink channel.

According to a third and fourth aspect of the present invention, the example roadside network unit is operated as follows:

ascertaining data of a size for transmission to at least one further roadside network unit; ascertaining a scheduling request message for a sidelink channel in an unlicensed frequency range, the scheduling request message indicating the size of the data available for transmission on the sidelink channel at the roadside network unit; transmitting the scheduling request for the sidelink channel to a network infrastructure-side network unit on an uplink channel; receiving a scheduling grant message, the scheduling grant message including an assignment of a number of sidelink resources of the sidelink channel to the roadside network unit, and the number of the assigned sidelink resources being sufficient to transmit the available data and additional data of other network units; checking whether the assigned sidelink resources on the sidelink channel are free; and transmitting the data on the assigned sidelink resources of the sidelink channel in the unlicensed frequency range as soon as the assigned sidelink resources on the sidelink channel are free.

By reserving sidelink resources for additional data of other network units, sufficient sidelink resources are available to the roadside network unit for successfully transmitting the ascertained data on the sidelink channel. If the assigned sidelink resources are occupied, the roadside network unit initially waits until the sidelink resources are free. A likelihood of collision is reduced thereby. Consequently, another roadside network unit, which is presently transmitting in this frequency range, is given priority in the first time range of the assigned sidelink resources. Moreover, if the assigned sidelink resources are detected to be occupied, the roadside network unit independently begins the transmission on the sidelink channel without any further signaling complexity by the network infrastructure-side network unit being necessary.

The provided example methods and roadside units may advantageously permit an equitable distribution of resources between two wireless communication networks operating in the same frequency range.

Additional features and advantages are are described bek=low in the context of exemplary embodiments.

DETAILED DESCRIPTION OF EXAMPLE EMBODIMENTS

Figure 1:
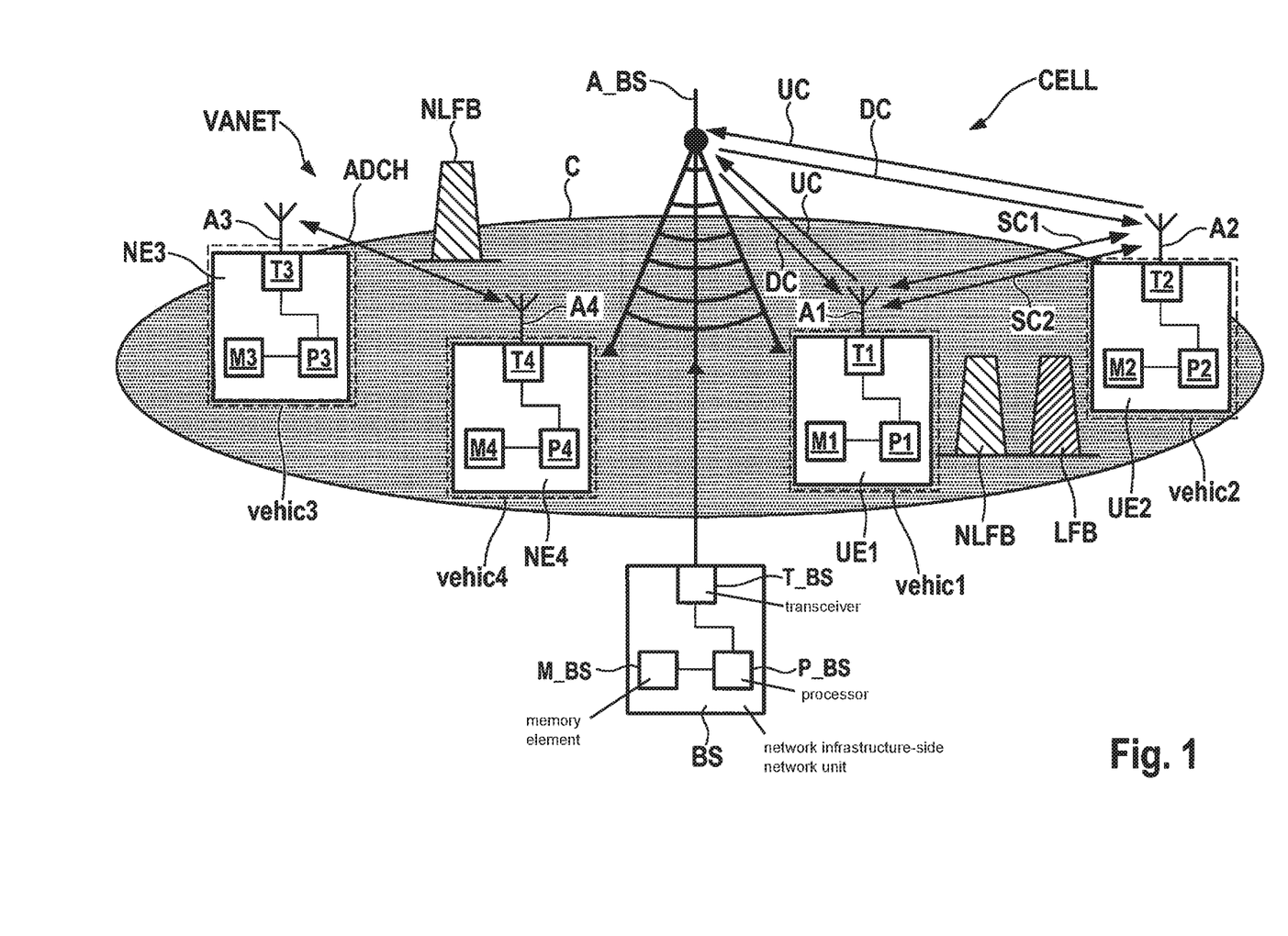
FIG. 1 shows a first cell-based wireless communication network and a second wireless communication network in accordance with the present invention.

FIG. 1 shows a cell-based wireless communication network CELL and an ad hoc wireless communication network VANET. Cell-based wireless communication network CELL includes a network infrastructure-side network unit BS, a roadside network unit UE1 and a roadside network unit UE2. Network infrastructure-side network unit BS includes a processor P_BS, a memory element M_BS and a transceiver T_BS. Network infrastructure-side network unit BS may also be referred to as a base station or eNodeB. Network infrastructure-side network unit BS is connected to a stationary antenna A_BS for the purpose of transmitting data on a downlink channel DC and receiving data on an uplink channel UC. Antenna A_BS includes, for example, a number of antennas and is designed, for example, as a remote radio head (RRH). Network infrastructure-side network unit BS and antenna A_BS provide a cell C, within which roadside network units UE1 and UE2 communicate with network unit BS. Of course, network infrastructure-side network unit BS may have a distributed design within the scope of a virtualization and be made up of separate network units. Network units BS, UE1 and UE2 are configured, for example, according to the LTE-V2X standard.

Roadside network unit UE1 includes a processor P1, a memory element M1, a transceiver T1 and an antenna A1. Roadside network unit UE2 includes a processor T2, a memory element M2, a transceiver TC2 and an antenna A2.

The two roadside network units UE1, UE2 are situated within cell C and are able to receive data on downlink channel DC and transmit data on uplink channel UC. The two roadside network units UE1, UE2 are able to communicate directly with each other via a sidelink channel SC1 in an unlicensed frequency range NLFB and via a sidelink channel SC2 in a licensed frequency range LFB.

In this description, reference is made to single uplink channel UC and single downlink channel DC. For example, uplink channel UC and downlink channel DC include particular subchannels, i.e., multiple channels are available in the uplink and in the downlink. The same applies to sidelink channels SC1, SC2.

Ad hoc wireless communication network VANET includes roadside network units NE3 and NE4. Network unit NE3 includes a processor P3, a memory element M3, a transceiver T3 and an antenna A3. Network unit NE4 includes a processor P4, a memory element M4, a transceiver T4 and an antenna A4. Transceivers T3 and T4 are configured, for example, according to the IEEE 802.11p standard. Network units NE3 and NE4 communicate directly with each other via an ad hoc channel ADCH in unlicensed frequency range NLFB. Ad hoc channel ADCH is arbitrated by transceivers T3, T4 via a CSMA/CA protocol (CSMA/CA: Carrier Sense Multiple Access/Collision Avoidance).

Network units NE3 and NE4 are situated proximate to network units UE1 and UE2. Due to this proximity, the particular transmission power output may be sufficient, so that transmissions on channels ADCH and SC1, which are transmitted in the same unlicensed frequency range NLFB, do not disadvantageously influence each other. The purpose of this description is to reduce this mutual disadvantageous influence.

Roadside network units UE1, UE2, NE3 and NE4 are situated in particular motor vehicles vehic1, vehic2, vehic3, vehic4 and are connected to a control unit situated therein, but not illustrated, for data exchange purposes. Alternatively, roadside network units UE1, UE2, NE3 and NE4 are part of the control unit in particular motor vehicle vehic1, vehic2, vehic3. In another alternative specific embodiment, roadside network units UE1, UE2, NE3 and NE4 are situated in a stationary infrastructure, for example a traffic light, instead of in a motor vehicle.

Sidelink channels SC1, SC2 and a sidelink in general are defined, for example, by the document 3GPP TS 36.300 V14.2.0 (March 2017), which is incorporated herein by reference in its entirety into the present description. The sidelink includes sidelink discovery, sidelink communication and V2X sidelink communication between network units UE1, UE2. The sidelink uses uplink resources and a physical channel structure similar to that of the uplink. The sidelink thus differs from the uplink with regard to the physical channel.

The sidelink is limited to individual cluster transmissions for the physical sidelink channels. The sidelink also uses a 1-symbol gap at the end of each sidelink subframe. A physical sidelink control channel (PSCCH) and a physical sidelink shared channel (PSSCH) are transmitted in the same subframe for the V2X sidelink communication. Sidelink channels SC1, SC2 are, for example, the PSSCH.

The physical layer processing of transport channels in the sidelink differs from the uplink transmission in the following steps: scrambling: the scrambling is not specific to the network unit for a physical sidelink discovery channel (PSDCH) and PSCCH; modulation: 64 QAM and 256 QAM are not supported for the sidelink (QAM: quadrature amplitude modulation). The PSCCH specifies sidelink resources and other transmission parameters, which are used by particular network unit UE1, UE2 for the PSSCH.

For the PSDCH, PSCCH and PSSCH demodulation, reference signals similar to the uplink demodulation reference signals are transmitted in the 4th symbol of the slot in the normal cyclic prefix (CP) and in the third symbol of the slot in the expanded CP. The sidelink demodulation reference signal sequence length corresponds to the size (number of subcarriers) of the assigned resource. For the V2X sidelink communication, reference signals are transmitted in the 3rd and 6th symbols of the first slot and in the 2nd and 5th symbols of the second slot in the CP. Reference signals based on a fixed base sequence, cyclical shift and orthogonal cover code are generated for PSDCH and PSCCH. For the V2X sidelink communication, the cyclical shift for PSCCH is randomly selected for each transmission.

For measurements of particular sidelink channel SC1, SC2, the following options are available on the part of network units UE1, UE2: reception power output of the sidelink reference signal (S-RSRP); reception power output of the sidelink discovery reference signal (SD-RSRP); reception power output of the PSSCH reference signal (PSSCH-RSRP); signal strength indicator for sidelink reference signals (S-RSSI).

Ad hoc channel ADCH and ad hoc wireless communication network VANET are defined, for example, by the IEEE standard "802.11p-2010—IEEE standard for information technology—Local and metropolitan area networks—Specific requirements—Part 11: Wireless LAN medium access control (MAC) and physical layer (PHY) specifications, Amendment 6: Wireless access in vehicular environments," which is incorporated herein by reference in its entirety into the present description. IEEE 802.11p is a standard for enhancement of the WLAN standard IEEE 802.11. The objective of IEEE 802.11p is to establish the WLAN technology in passenger motor vehicles and to create a reliable interface for applications for intelligent transport systems (ITS). IEEE 802.11p is also the basis for dedicated short-range communication (DSRC) in the 5.85 GHz to 5.925 GHz frequency band. To avoid confusion with the European DSRC version, the term ITS-G5 is rather used instead of DSRC, primarily in Europe.

The document "ETSI EN 302 663 V1.2.0 (November 2012)," which is incorporated herein by reference in its entirety into the present description, describes the two lowermost layers of the ITS-G5 technology (ITS G5: Intelligent transport systems operating in the 5 GHz frequency band), the physical layer and the data link layer. Transceivers T3 and T4 implement, for example, at least these two lowermost layers and corresponding functions according to "ETSI EN 302 663 V1.2.0 (November 2012)," for the purpose of using ad hoc channel ADCH. The following unlicensed frequency ranges, which are part of unlicensed frequency range NLFB, are available for using ad hoc channel ADCH in Europe: 1) ITS-G5A for safety-relevant applications in the frequency range of 5.875 GHz to 5.905 GHz; 2) ITS-G5B for non-safety-relevant applications in the frequency range of 5.855 GHz to 5.875 GHz; and 3) ITS-G5D for operating ITS applications in the frequency range of 5.905 GHz to 5.925 GHz. ITS-G5 permits a communication between the two network units UE1 and UE2 outside the context of a base station. ITS-G5 permits the immediate exchange of data frames and avoids a management overhead, which is used in setting up a network.

The document "ETSI TS 102 687 V1.1.1 (July 2011)," which is incorporated herein by reference in its entirety into the present description, describes a "decentralized congestion control mechanism" for ITS-G5. Ad hoc channel ADCH is used, among other things, for exchanging data relating to traffic safety and traffic efficiency. Transceivers T3 and T4 implement, for example, the functions described in the document "ETSI TS 102 687 V1.1.1 (July 2011)." The applications and services in ITS-G5 are based on the cooperative behavior of the roadside network units, which form ad hoc network VANET (VANET: vehicular ad hoc network). Ad hoc network VANET permits time-critical road traffic applications, in which a rapid exchange of information is necessary to warn and assist the driver and/or the vehicle in a timely manner. To ensure proper functioning of ad hoc network VANET, decentralized congestion control mechanisms (DCC) are used for ad hoc channel ADCH of ITS-G5. DCC has functions that are situated on multiple layers of the ITS architecture. The DCC mechanisms are based on knowledge of the channel. The channel status information is obtained by channel sounding. Channel status information may be obtained by the transmit power control (TPC), transmit rate control (TRC) and transmit data rate control (TDC) methods. The methods ascertain the channel status information as a function of receive signal level thresholds or preamble information of detected packets.

Figure 2:
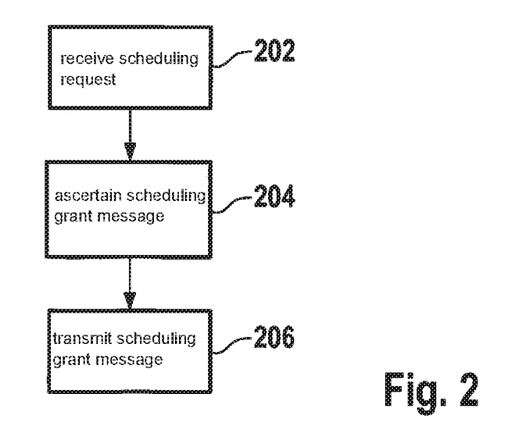
FIGS. 2 and 3 each show a schematic flowchart in accordance with the present invention.

FIG. 2 shows a schematic flowchart for operating network infrastructure-side network unit BS from FIG. 1. In a step 202, a scheduling request message for the sidelink channel in an unlicensed frequency range is received on the uplink channel by one of the roadside network units. In a step 204, a scheduling grant message is ascertained as a function of the size of the available data, the scheduling grant message including an assignment of a number of sidelink resources of the sidelink channel to the roadside network unit, and the assigned number of sidelink resources being sufficient to transmit both the data available at the roadside network unit and data from other roadside network units. In a step 206, the scheduling grant message is transmitted on the downlink channel to the roadside network unit.

Figure 3:
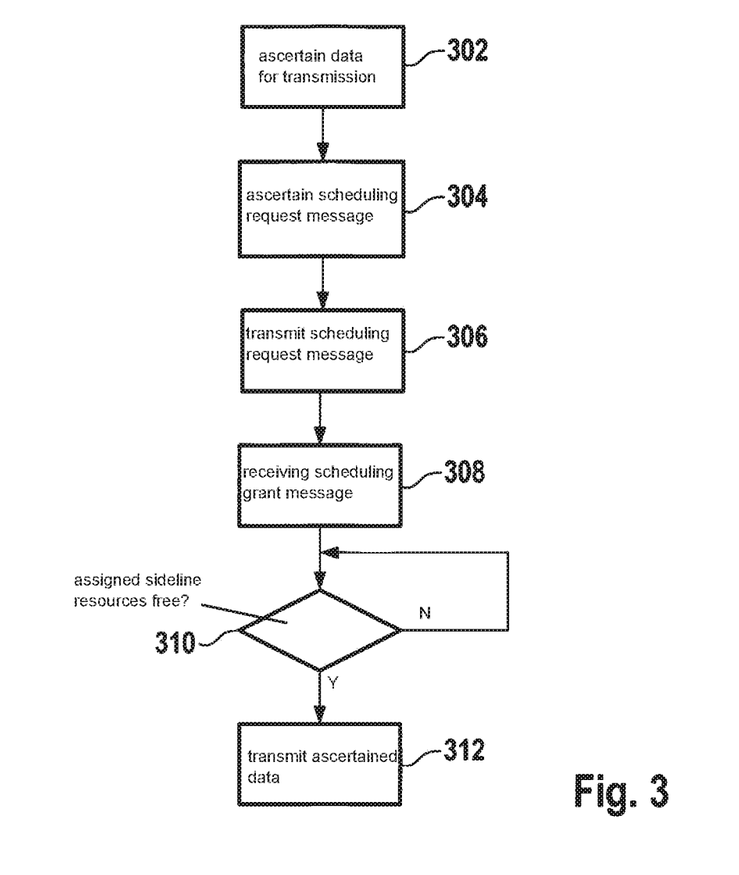

FIG. 3 shows a schematic flowchart for operating roadside network unit UE1 and/or UE2 from FIG. 1. In a step 302, data are ascertained for transmission to at least one additional roadside network unit. In a step 304, the scheduling request message is ascertained for the sidelink channel in the unlicensed frequency range, the scheduling request message indicating a size of the data available at the roadside network unit for transmission on the sidelink channel. In a step 306, the scheduling request message for the sidelink channel is transmitted on an uplink channel to a network infrastructure-side network unit. In a step 308, a scheduling grant message is received, the scheduling grant message including an assignment of a number of sidelink resources of the sidelink channel to the roadside network unit, and the number of assigned sidelink resources being sufficient to transmit the ascertained data and additional data on the sidelink channel. In a step 310, it is checked whether the assigned sidelink resources on the sidelink channel are free. In a step 312, the ascertained data is transmitted on the assigned sidelink resources of the sidelink channel in the unlicensed frequency range as soon as the assigned sidelink resources on the sidelink channel are free.

Figure 4:
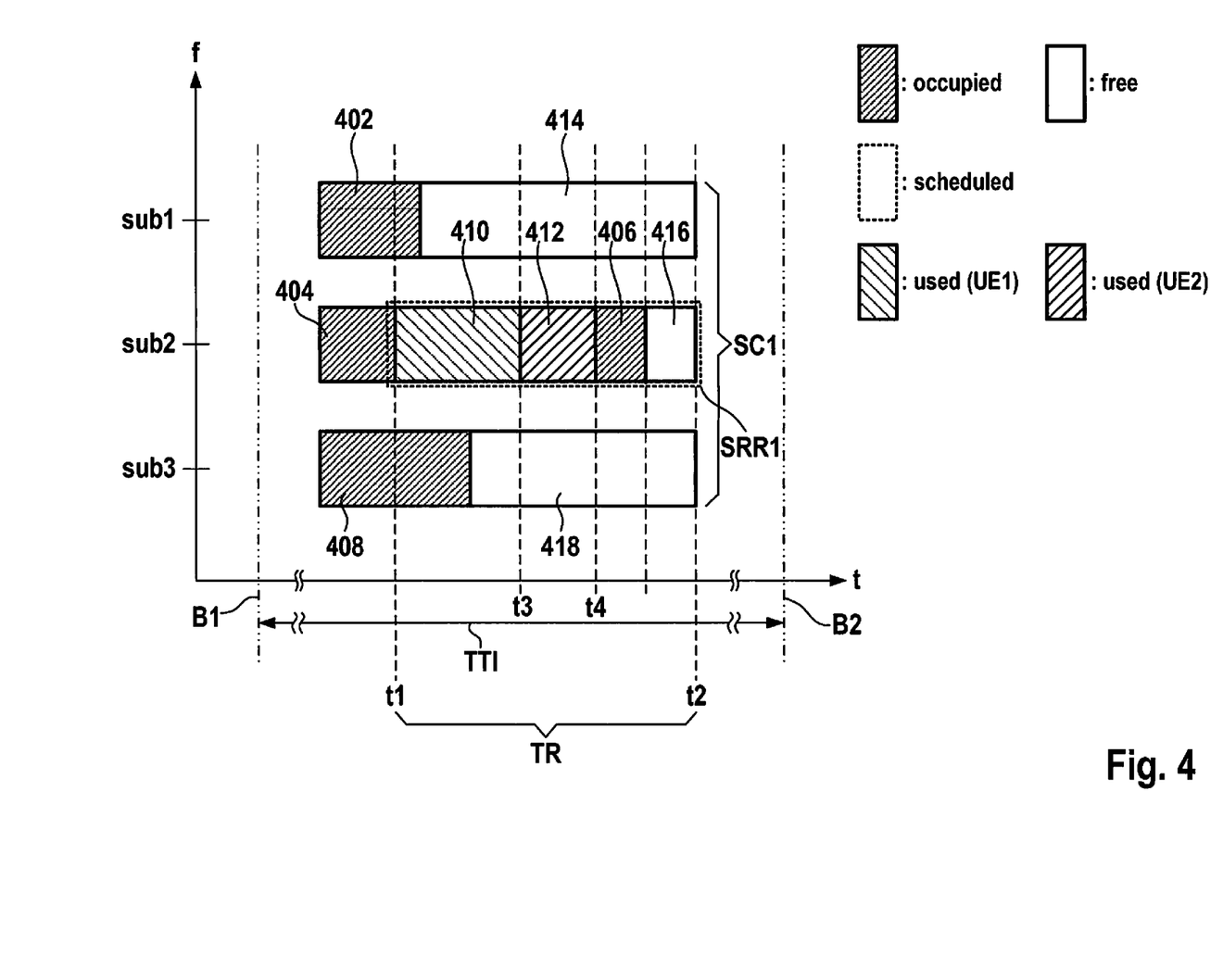
FIGS. 4 through 6 each show a schematic time-frequency diagram in accordance with the present invention.

FIG. 4 shows a schematic time-frequency diagram. A transmission time interval TTI is a period of time which is limited by two resource limits B1, B2. Resource limits B1 and B2 are ascertained by network units UE1 and UE2 as a function of a received synchronization signal. Sidelink resources SRR1 are reserved within resource limits B1 and B2. Sidelink resources SRR1 were assigned at a previous time by the network infrastructure-side network unit and communicated via the scheduling grant message. Sidelink resources SRR1 include, for example, a number of physical resource blocks (PRBs). In the present case, sidelink resources SSR1 include a subcarrier sub2 of a number of subcarriers sub1 through sub3 and a time period TR, time period TR being defined by an enable point in time t1 and an end point in time t2. Subcarriers sub1 through sub3 may also be referred to as subchannels of sidelink channel SC1.

Blocks 402, 404, 406 and 408 are occupied by communication on ad hoc channel ADCH. This occupancy is ascertained locally by particular roadside network unit UE1, UE2 for the cell-based wireless communication network. Correspondingly, network unit UE1 may determine at enable point in time t1 that subcarrier sub2 is free for the purpose of transmitting its data within sidelink resources SRR1 in a block 410. Network unit UE1 ends its transmission of data at a point in time t3. At this point in time t3, network unit UE2 determines that subcarrier sub2 is free and starts sending its data in block 412. Network unit UE2 ends the data transmission on subcarrier sub2 at a point in time t4. This is detected, for example, by network unit NE3 of the ad hoc wireless communication network, which begins transmitting its data at point in time t4, which is reflected in an occupancy of subcarrier sub2. It should be noted that network unit NE3 does not necessarily use subcarrier sub2, since an underlying carrier of a carrier frequency may be a different one in the ad hoc wireless communication network. Nevertheless, an occupancy according to blocks 402 through 408 results for the cell-based wireless communication network. Blocks 414, 416 and 418 are not occupied.

In one specific embodiment, network units UE1 and UE2 are scheduled together. This means that the scheduling grant message received by network units UE1 and UE2 includes point in time t3, which is relative to point in time t1. Point in time t3 is thus in a relative relation to point in time t1. This has the background—for example, as explained below in reference to FIG. 5—that the actual start of transmission may be shifted to point in time t1 due to a completed ITS-G5 communication. Consequently, the precise point in time at which network unit UE2 begins transmission and network unit UE1 ends transmission is not previously set by network unit BS, but instead network units UE1 and UE2 adapt the two points in time t1 and t3 to the occupancy situation in the wireless network. Network units UE1 and UE2 detect point in time t1, at which sidelink resources SRR are not occupied, based on the channel monitoring. Since point in time t1 is assigned to first network unit UE1, network unit UE1 transmits in block 410. Since point in time t2 is assigned to second network unit UE2, network unit UE2 transmits in block 412. The above discussion applies similarly to point in time t6 from FIG. 5. Points in time t1 and t3 are also referred to as enable points in time. Due to this relative scheduling, network unit BS advantageously influences the order in which network units UE1 and UE2 transmit. Consequently, network unit BS may, for example, take into account the latency requirements of individual network units UE1, UE2.

Due to the assignment of sidelink resources SRR1 to a number of network units UE1, UE2, and thus that network units UE1, UE2 access assigned sidelink resources SSR1 according to a listen-before-talk method, it is advantageously achieved that network units NE3 and NE4 of the ad hoc wireless communication network may actively access the ad hoc channel in the same frequency range as the sidelink channel both outside reserved sidelink resources SSR1 and within sideline resources SSR1. Network units NE3 and NE4 use a listen-before-talk method, i.e., they access the particular channel only if a piece of channel status information indicates that the particular channel is free. On the other side, assigned sidelink resources SSR1 are determined to be sufficiently large so that the data in blocks 410 and 412 may be transmitted undisturbed.

In the present case, sidelink resources SRR'1 are assigned to the group of network units UE1 and UE2 for a particular transmission of data. In an alternative specific embodiment, sidelink resources SRR1 are assigned to a single one of network units UE1 and UE2.

Figure 5:
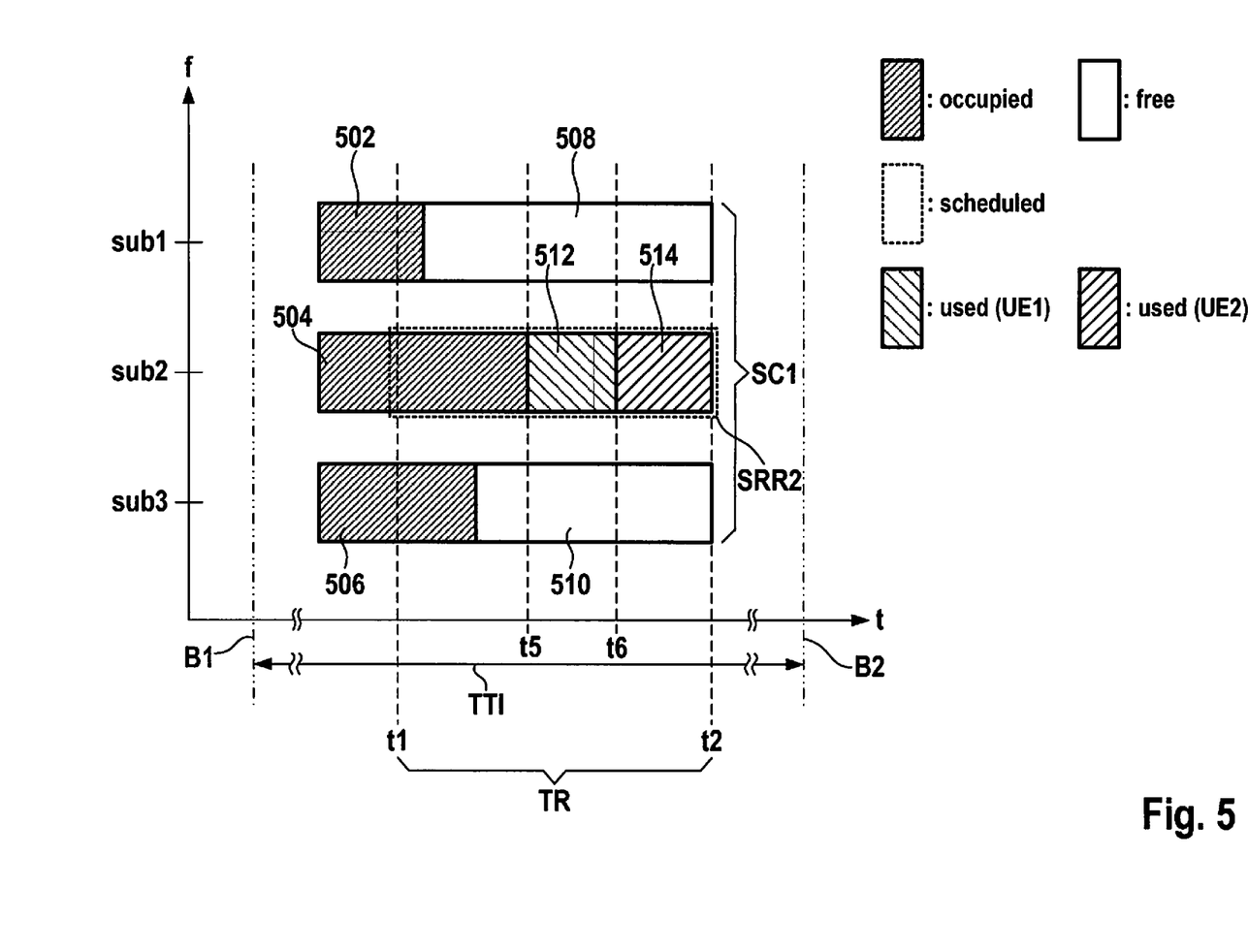

FIG. 5 shows a schematic time-frequency diagram. Blocks 502, 504 and 506 signify an occupancy of subcarriers sub1 through sub3. Blocks 508 and 510 indicate a non-occupancy of particular subcarriers sub1 and sub3. In contrast to FIG. 4, in FIG. 5 it is determined by network units UE1 and UE2 at enable point in time t1 that subcarrier sub2 is occupied by block 504. At a point in time t5, network unit UE1 determines that assigned sidelink resources SRR2 are free and begins to transmit its data on subcarrier sub2 in a block 512 at point in time t5. Network unit UE1 ends the transmission of data on subcarrier sub2 at a point in time t6. At a point in time t6, network unit UE2 determines that assigned sidelink resources SRR2 are free and begins to transmit its data on subcarrier sub2 in a block 514.

Due to the listen-before-talk method used by network units UE1 and UE2, it is advantageously achieved that a continuous data transmission in the ad hoc network, for example of block 504, is not disturbed at point in time t1. Instead, subcarrier sub2 is not accessed by network unit UE1 according to block 512 until point in time t5, i.e., after conclusion of the transmission in the ad hoc network.

Figure 6:
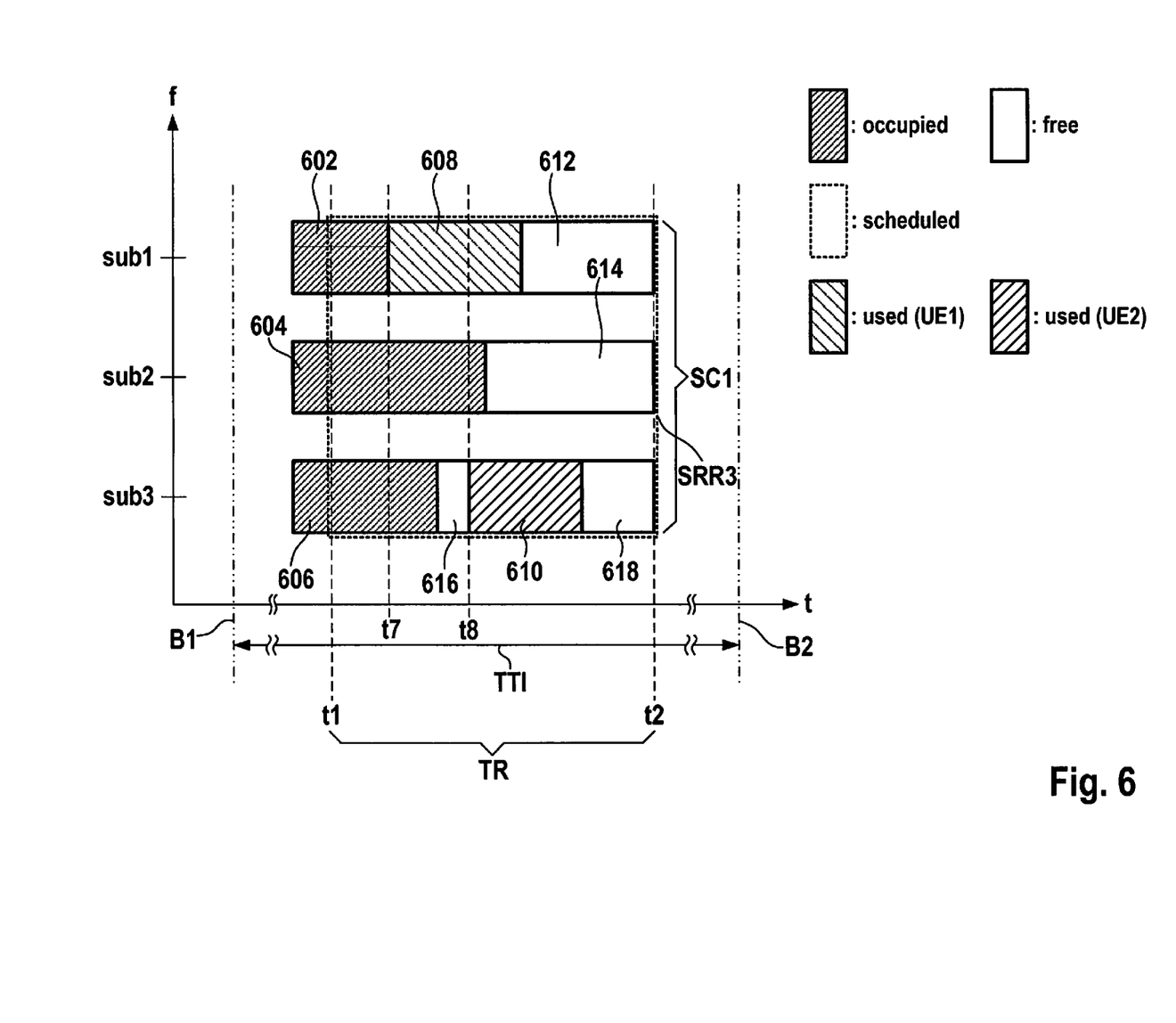

FIG. 6 shows a schematic time-frequency diagram. Blocks 602, 604 and 606 signify an occupancy of subcarriers sub1, sub2 and sub3. At point in time t1, it is determined that all available subcarriers sub1, sub2 and sub3 are occupied in reserved sidelink resources SRR3. In contrast to FIGS. 4 and 5, sidelink resources SRR3 include the number of subcarriers sub1 through sub3. Accordingly, network units UE1 and UE2, to which sidelink resources SRR3 were assigned by the infrastructure-side network unit, check whether at least one of subcarriers sub1 through sub3 is or is not free.

At a point in time t7, network unit UE1 determines that first subcarrier sub1 is free and transmits its data in a block 608. At a point in time t8, second network unit UE2 determines that subcarrier sub3 is free and begins transmitting its data in a block 610. Blocks 612, 614, 616 and 618 are not occupied.

Due to the fact that assigned sidelink resources SRR3 include multiple subcarriers sub1 through sub3, it is advantageously achieved that the likelihood of transmission for network units UE1 and UE2 of the cell-based wireless communication network is increased and the delay in transmission with regard to enable point in time t1 is simultaneously shortened.

In FIGS. 4 through 6, it is assumed in simplified form that the channel measurement for determining whether the particular subcarrier is occupied and the subsequent start of transmitting the data occur at the same time on the particular subcarrier. Of course, this is not the case, and a chronologically shorter channel measurement and subsequent data transmission take place first.

Figure 7:
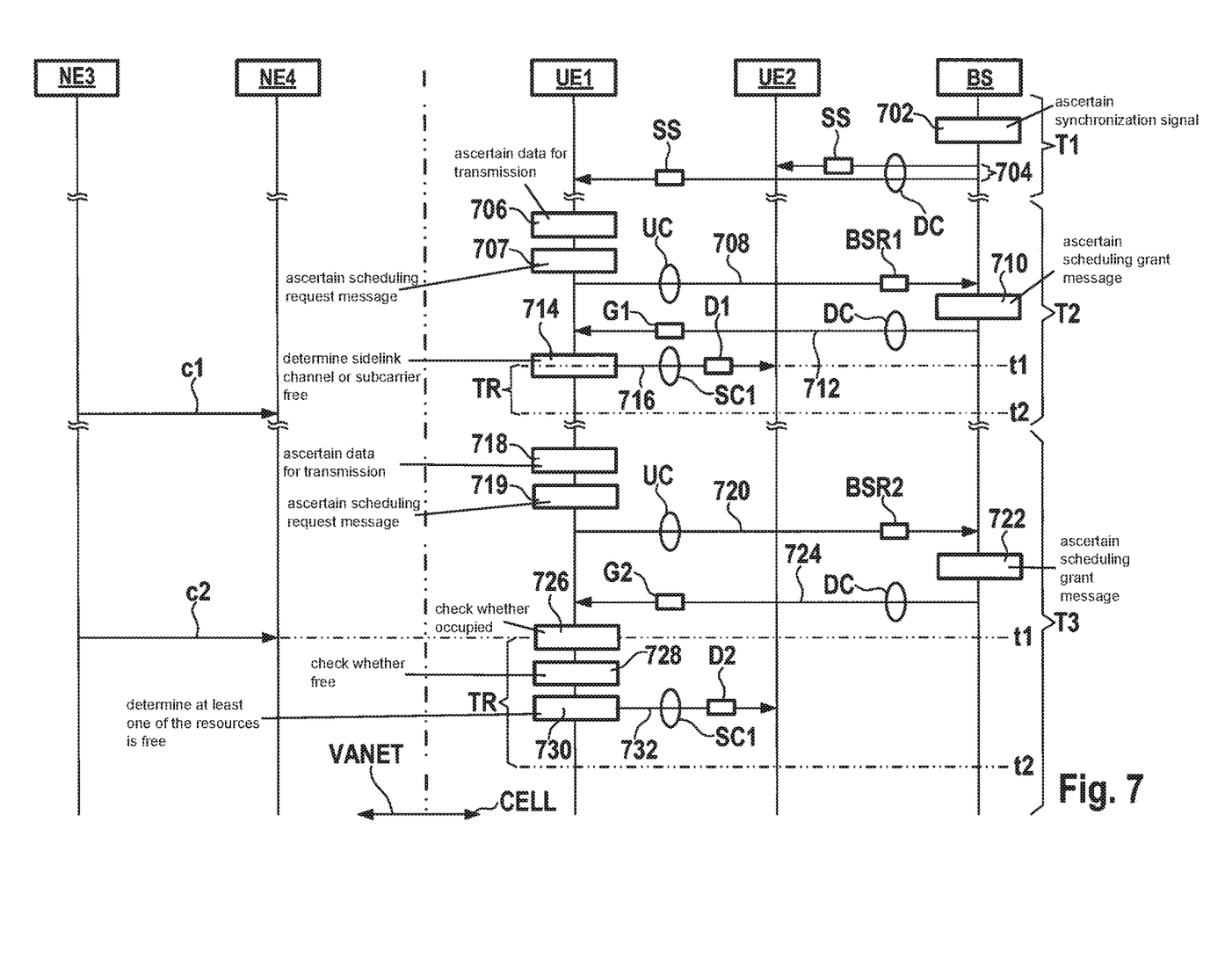
FIG. 7 shows a schematic sequence diagram in accordance with the present invention.

FIG. 7 shows a schematic sequence diagram. According to a first time range T1, network unit BS ascertains in a step 702 a synchronization signal SS, which is transmitted to network units UE1 and UE2 on downlink channel DC in a step 704. Synchronization signal SS is, for example, a primary synchronization signal (PSS) or a secondary synchronization signal (SSS). Synchronization signal SS specifies resource limits B1 and B2 mentioned in FIGS. 4 through 6.

In a step 706, network unit UE1 ascertains data D1 for transmission to network unit UE2 within time period T2. Network unit UE1 ascertains a scheduling request message BSR1 in a step 707. In a step 708, network unit UE1 transmits scheduling request message BSR1 to network unit BS on uplink channel UC. As a function of scheduling request message BSR1, network unit BS ascertains a scheduling grant message G1 in a step 710, which is transmitted to network unit UE1 on downlink channel DC in a step 712. Scheduling grant message G1 includes or indicates the sidelink resources assigned to network working UE1, which are represented by time period TR in the drawing. At point in time t1, network unit UE1 determines in a step 714 that the sidelink channel or a subcarrier situated there is free and transmits data D1 to network unit UE2 on sidelink channel SC1 in a step 716. If the transmission of data D1 is concluded, a communication c1 may still take place in ad hoc wireless communication network VANET within time period TR.

Within a time period T3, network unit UE1 ascertains data D2 for transmission to network unit UE2 in a step 718. Network unit UE1 ascertains a scheduling request message BSR2 in a step 719. In a step 720, network unit UE1 transmits scheduling request message BSR2, which indicates the size of ascertained data D2, to network unit BS on uplink channel UC. As a function of scheduling request message BSR2, in particular as a function of the transmitted size, network unit BS ascertains a scheduling grant message G2, including sidelink resources, in a step 722, which is transmitted to network unit UE1 on downlink channel DC in a step 724.

At point in time t1, network unit UE1 carries out a channel check in a step 726 and determines that the assigned sidelink resources are occupied, for example by a communication c2 in ad hoc wireless communication network VANET. In a step 728, it is again checked whether the assigned sidelink resources are free. In a step 730, first network unit UE1 determines that at least one of the assigned sidelink resources is free and immediately begins, in step 732, to transmit data D2 to network unit UE2 on sidelink channel SC1 within the assigned sidelink resources.

Scheduling request message BSR1, BSR2 indicates the size of ascertained data D1, D2. In one specific embodiment, the size is the actual size of the data. Data D1, D2 thus has a particular size, which is transmitted by particular scheduling request message BSR1, BSR2. In another specific embodiment, scheduling request message BSR1, BSR2 is an index which indicates the size of the ascertained data. In another specific embodiment, the size of the data is estimated by network unit BS as a function of scheduling request message BSR1, BSR2, whereby an indication of the size of the ascertained data is also given.

Scheduling grant messages G1, G2 include the assignment of sidelink resources SRR1, SRR2, SRR3 from FIG. 4, 5 or 6, which are sufficient to transmit not only the ascertained data but also other data coming from other network units on the sidelink channel or the ad hoc channel.

Due to the ascertainment and reservation of sidelink resources SRR1 through SRR3 in FIGS. 4, 5 and 6 on the part of the network infrastructure-side network unit and a listen-before-talk method on the part of the roadside network unit, it is advantageously achieved that an occupancy of a subcarrier by a network unit of another network technology is awaited, and the other network technology, for example of the ad hoc wireless communication network, is not placed at a disadvantage. Consequently, the sidelink resources are centrally reserved with the capacity beyond the sidelink transmission requirement. The roadside network units wait for the assigned sidelink channel and transmit only when the latter is free on the assigned sidelink resources.

Additional aspects of the present invention are described in the following paragraphs:

(Paragraph 1) A method for operating a network infrastructure-side network unit of a cell-based wireless communication network, the method including: receiving a scheduling request message for a sidelink channel in an unlicensed frequency range on an uplink channel by a roadside network unit, the scheduling request message indicating a size of data available for transmission on the sidelink channel for the roadside network unit; ascertaining a scheduling grant message as a function of the size of the available data, the scheduling grant message including an assignment of a number of sidelink resources of the sidelink channel to the roadside network unit, and the assigned number of sidelink resources being sufficient to transmit the available data and additional data of other roadside network units; and transmitting the scheduling grant message to the roadside network unit on a downlink channel.

(Paragraph 2) The method according to Paragraph 1, including: ascertaining a synchronization signal, in particular a primary synchronization signal or a secondary synchronization signal, the synchronization signal signaling sidelink resource limits, in particular limits of a radio frame and/or a radio subframe; transmitting the synchronization signal to roadside network units; and the assigned sidelink resources including an enable point in time and an end point in time for a transmission on the sidelink channel, the enable point in time and the end point in time being within neighboring resource limits.

(Paragraph 3) The method according to one of the preceding paragraphs, the enable point in time and the end point in time of the sidelink resources being ascertained without synchronization with the synchronization signal.

(Paragraph 4) The method according to one of the preceding paragraphs, the assigned sidelink resources including a number of subcarriers of the sidelink channel.

(Paragraph 5) The method according to one of the preceding paragraphs, a second enable point in time being ascertained, the second enable point in time being situated relative to the first enable point in time for the clear to send for the first roadside network unit, and including a clear to send for a second roadside network unit, and the scheduling grant message including the second enable point in time.

(Paragraph 6) A network infrastructure-side network unit (BS), an antenna and a transceiver being configured to receive a scheduling request message for a sidelink channel in an unlicensed frequency range on an uplink channel by a roadside network unit, the scheduling request message indicating a size of data available for transmission on the sidelink channel for the roadside network unit; a processor being configured to ascertain a scheduling grant message as a function of the size, the scheduling grant message including an assignment of a number of sidelink resources of the sidelink channel to the roadside network unit, and the assigned number of sidelink resources being sufficient to transmit the available data and additional data of other roadside network units; and the antenna and the receiver being configured to transmit the scheduling grant message to the roadside network unit on a downlink channel.

(Paragraph 7) A method for operating a roadside network unit of a cell-based wireless communication network, the method including: ascertaining data for transmission to at least one further roadside network unit; ascertaining a scheduling request message for a sidelink channel in an unlicensed frequency range, the scheduling request message indicating a size of the ascertained data available for transmission on the sidelink channel for the roadside network unit; transmitting the scheduling request message for the sidelink channel to a network infrastructure-side network unit on an uplink channel; receiving a scheduling grant message, the scheduling grant message including an assignment of a number of sidelink resources of the sidelink channel to the roadside network unit, and the assigned number of sidelink resources being sufficient to transmit the available data and additional data of other roadside network units; checking whether the assigned sidelink resources on the sidelink channel are free; and transmitting the ascertained data on the assigned sidelink resources of the sidelink channel in the unlicensed frequency range as soon as the assigned sidelink resources on the sidelink channel are free.

(Paragraph 8) The method according to Paragraph 7, including: receiving a synchronization signal, in particular a primary synchronization signal or a secondary synchronization signal, the synchronization signal signaling sidelink resource limits, in particular limits of a radio frame and/or a radio subframe; the assigned sidelink resources including an enable point in time and an end point in time for a transmission on the sidelink channel, the enable point in time and the end point in time being within neighboring sidelink resource limits.

(Paragraph 9) The method according to Paragraph 7 or 8, the assigned sidelink resources including a number of subcarriers, the method including: checking whether the subcarriers of the assigned sidelink resources on the sidelink channel are each free; and transmitting the data on the first subcarrier of the assigned sidelink resources to be free.

(Paragraph 10) The method according to one of Paragraphs 7 through 9, the scheduling grant message including a second enable point in time, the second enable point in time being situated relative to a first enable point in time for the clear to send for another roadside network unit and including a clear to send for the operated roadside network unit, the first enable point in time being ascertained, in particular as a function of the check as to whether one of the subcarriers of the assigned sidelink resources on the sidelink channel is free, another roadside network unit beginning to transmit at the first enable point in time; and the transmission of the ascertained data on the assigned sidelink resources being started by the operated roadside network unit when the second point in time relative to the first point in time has been reached.

(Paragraph 11) A roadside network unit, a processor thereof being configured to ascertain data for transmission to at least one further roadside network unit and to ascertain a scheduling request message for a sidelink channel in an unlicensed frequency range, the scheduling request message indicating a size of the ascertained data available for transmission on the sidelink channel for the roadside network unit; an antenna and a transceiver being configured to transmit the scheduling request for the sidelink channel to a network infrastructure-side network unit on an uplink channel; to receive a scheduling grant message, the scheduling grant message including an assignment of a number of sidelink resources of the sidelink channel to the roadside network unit, and the assigned number of sidelink resources being sufficient to transmit the available data and additional data of other roadside network units; to check whether the assigned sidelink resources on the sidelink channel are free; and to transmit the ascertained data on the assigned sidelink resources of the sidelink channel in the unlicensed frequency range as soon as the assigned sidelink resources on the sidelink channel are free.

(Paragraph 12) A motor vehicle, including the roadside network unit according to the preceding paragraph.

(Paragraph 13) A method for operating a cell-based wireless communication network according to one of Paragraphs 1 through 5 and one of Paragraphs 7 through 10.

What is claimed is:

1. A method for operating a network infrastructure-side network unit of a cell-based wireless communication network, the method comprising the following steps:
   receiving a scheduling request message for a sidelink channel in an unlicensed frequency range on an uplink channel by a roadside network unit, the scheduling request message indicating a size of data available for transmission to the roadside network unit on the sidelink channel;
   ascertaining a scheduling grant message as a function of the size of the available data, the scheduling grant message including an assignment of a number of sidelink resources of the sidelink channel to the roadside network unit, and the assigned number of sidelink resources being sufficient to transmit the available data and additional data of other roadside network units; and
   transmitting the scheduling grant message to the roadside network unit on a downlink channel.

2. The method as recited in claim 1, further comprising the following steps:
   ascertaining a synchronization signal, the synchronization signal signaling sidelink resource limits including limits of a radio frame and/or a radio subframe; and
   transmitting the synchronization signal to roadside network units; and
   wherein the assigned sidelink resources include an enable point in time and an end point in time for a transmission on the sidelink channel, the enable point in time and the end point in time being situated within neighboring resource limits.

3. The method as recited in claim 2, wherein the synchronization signal is a primary synchronization signal or a secondary synchronization signal.

4. The method as recited in claim 2, wherein the enable point in time and the end point in time of the sidelink resources are ascertained without synchronization with the synchronization signal.

5. The method as recited in claim 1, wherein the assigned sidelink resources include a number of subcarriers of the sidelink channel.

6. The method as recited in claim 1, wherein a second enable point in time is ascertained, the second enable point in time being situated relative to the first enable point in time for a clear to send for the first roadside network unit and including a clear to send for a second roadside network unit, and wherein the scheduling grant message includes the second enable point in time.

7. A network infrastructure-side network unit, comprising:
an antenna and a transceiver which are configured to receive a scheduling request message for a sidelink channel in an unlicensed frequency range on an uplink channel by a roadside network unit, the scheduling request message indicating a size of data available for transmission on the sidelink channel at the roadside network unit; and
a processor configured to ascertain a scheduling grant message as a function of the size, the scheduling grant message including an assignment of a number of sidelink resources of the sidelink channel to the roadside network unit, and the assigned number of sidelink resources being sufficient to transmit the available data and additional data of other roadside network units;
wherein the antenna and the transceiver are configured to transmit the scheduling grant message to the roadside network unit on a downlink channel.

8. A method for operating a roadside network unit of a cell-based wireless communication network, the method comprising the following steps:
ascertaining data for transmission to at least one further roadside network unit;
ascertaining a scheduling request message for a sidelink channel in an unlicensed frequency range, the scheduling request message indicating a size of the ascertained data available for transmission on the sidelink channel for the roadside network unit;
transmitting the scheduling request message for the sidelink channel to a network infrastructure-side network unit on an uplink channel;
receiving a scheduling grant message, the scheduling grant message including an assignment of a number of sidelink resources of the sidelink channel to the roadside network unit, and the assigned number of sidelink resources being sufficient to transmit the available data and additional data of other roadside network unit;
checking whether the assigned sidelink resources on the sidelink channel are free; and
transmitting the ascertained data on the assigned sidelink resources of the sidelink channel in the unlicensed frequency range as soon as the assigned sidelink resources on the sidelink channel are free.

9. The method as recited in claim 8, further comprising the following step:
receiving a synchronization signal, the synchronization signal signaling sidelink resource limits including limits of a radio frame and/or a radio subframe;
wherein the assigned sidelink resources including an enable point in time and an end point in time for a transmission on the sidelink channel, the enable point in time and the end point in time being situated within neighboring resource limits.

10. The method as recited in claim 9, wherein the synchronization signal includes a primary synchronization signal or a secondary synchronization signal.

11. The method as recited in claim 9, wherein the assigned sidelink resources include a number of subcarriers, wherein the method further comprises the following steps:
checking whether the subcarriers of the assigned sidelink resources on the sidelink channel are each free; and
transmitting the data on the subcarrier of s first of the assigned sidelink resources to be free.

12. The method as recited in claim 10, wherein:
the scheduling grant message includes a second enable point in time, the second enable point in time being situated relative to a first enable point in time for a clear to send for a further roadside network unit and including a clear to send for the roadside network unit;
the first enable point in time is ascertained as a function of the check as to whether one of the subcarriers of the assigned sidelink resources on the sidelink channel is free, a further roadside network unit beginning to transmit at the first enable point in time; and
the transmission of the ascertained data on the assigned sidelink resources being started by the operated roadside network unit when the second point in time relative to the first point in time is reached.

13. A roadside network unit, comprising:
a processor configured to ascertain data for transmission to at least one further roadside network unit and a scheduling request message for a sidelink channel in an unlicensed frequency range, the scheduling request message indicating a size of the ascertained data available for transmission on the sidelink channel for the roadside network unit; and
an antenna and a transceiver which are configured to transmit the scheduling request message for the sidelink channel to a network infrastructure-side network unit on an uplink channel, and to receive a scheduling grant message, the scheduling grant message including an assignment of a number of sidelink resources of the sidelink channel to the roadside network unit, and the assigned number of sidelink resources being sufficient to transmit the available data and additional data of other roadside network units, the antenna and the transceiver being further configured to check whether the assigned sidelink resources on the sidelink channel are free, and to transmit the ascertained data on the assigned sidelink resources of the sidelink channel in the unlicensed frequency range as soon as the assigned sidelink resources on the sidelink channel are free.

14. A motor vehicle, including the roadside network unit, the roadside network unit comprising:
a processor configured to ascertain data for transmission to at least one further roadside network unit and a scheduling request message for a sidelink channel in an unlicensed frequency range, the scheduling request message indicating a size of the ascertained data available for transmission on the sidelink channel for the roadside network unit; and
an antenna and a transceiver which are configured to transmit the scheduling request message for the sidelink channel to a network infrastructure-side network unit on an uplink channel, and to receive a scheduling grant message, the scheduling grant message including an assignment of a number of sidelink resources of the sidelink channel to the roadside network unit, and the assigned number of sidelink resources being sufficient to transmit the available data and additional data of other roadside network units, the antenna and the transceiver being further configured to check whether the assigned sidelink resources on the sidelink channel are free, and to transmit the ascertained data on the assigned sidelink resources of the sidelink channel in the unlicensed frequency range as soon as the assigned sidelink resources on the sidelink channel are free.

15. A method for operating a cell-based wireless communication network, comprising:
- receiving, by a network infrastructure-side network unit of a cell-based wireless communication network, a scheduling request message for a sidelink channel in an unlicensed frequency range on an uplink channel by a roadside network unit, the scheduling request message indicating a size of data available for transmission to the roadside network unit on the sidelink channel;
- ascertaining, by the network infrastructure-side network unit, a scheduling grant message as a function of the size of the available data, the scheduling grant message including an assignment of a number of sidelink resources of the sidelink channel to the roadside network unit, and the assigned number of sidelink resources being sufficient to transmit the available data and additional data of other roadside network units;
- transmitting, by the network infrastructure-side network unit, the scheduling grant message to the roadside network unit on a downlink channel;
- ascertaining, by the roadside network unit, data for transmission to at least one further roadside network unit;
- ascertaining, by the roadside network unit, the scheduling request message for the sidelink channel in an unlicensed frequency range, the scheduling request message indicating the size of the ascertained data available for transmission on the sidelink channel for the roadside network unit;
- transmitting, by the roadside network unit, the scheduling request message for the sidelink channel to a network infrastructure-side network unit on the uplink channel;
- receiving, by the roadside network unit, the scheduling grant message, the scheduling grant message including the assignment of the number of sidelink resources of the sidelink channel to the roadside network unit, and the assigned number of sidelink resources being sufficient to transmit the available data and the additional data of the other roadside network unit;
- checking whether the assigned sidelink resources on the sidelink channel are free; and
- transmitting the ascertained data on the assigned sidelink resources of the sidelink channel in the unlicensed frequency range as soon as the assigned sidelink resources on the sidelink channel are free.

* * * * *